No. 650,104. Patented May 22, 1900.
F. O. WELLCOME.
TRAP NEST.
(Application filed Sept. 16, 1899.)
(No Model.)

Witnesses.
Harry Taylor Henson
Henry J. Glendenning

Inventor.
Frank O. Wellcome

UNITED STATES PATENT OFFICE.

FRANK ORVILLE WELLCOME, OF YARMOUTH, MAINE.

TRAP-NEST.

SPECIFICATION forming part of Letters Patent No. 650,104, dated May 22, 1900.

Application filed September 16, 1899. Serial No. 730,759. (No model.)

*To all whom it may concern:*

Be it known that I, FRANK ORVILLE WELLCOME, a citizen of the United States, residing at Yarmouth, in the county of Cumberland and State of Maine, have invented certain new and useful Improvements in Trap-Nests, of which the following is a specification.

My invention relates to a class of devices employed by poultrymen for the purpose of securing and keeping a record of the eggs laid by particular hens in order that the laying qualities of given hens and the number and character of the eggs laid by them may be unerringly ascertained.

The object of my invention is the production of an easily-constructed, cheap, and reliable trap-nest in the employment of which it is impossible for confusion, either as to hens or as to the eggs, to arise, and which, moreover, it is further impossible for more than one hen to occupy at the same time.

To the foregoing ends my invention consists of the devices set forth in this specification and a typical embodiment of which is illustrated in the accompanying drawings, the particular subject-matter which I claim as novel being hereinafter definitely specified.

Figure 1:
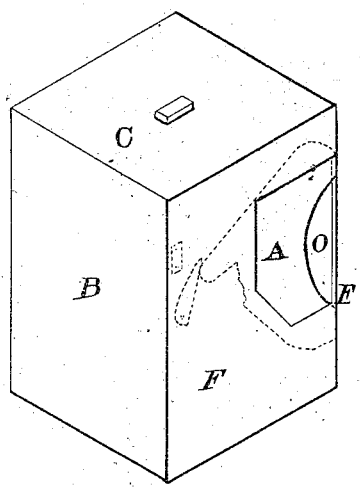
Figure 2:
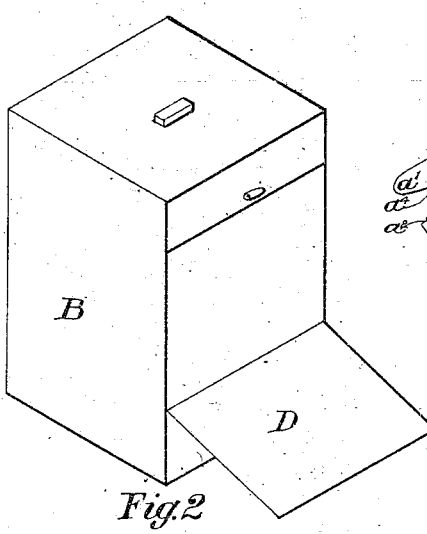
Figure 3:
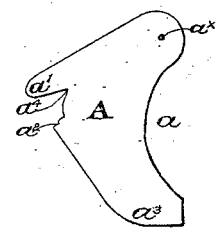
Figure 4:
Figure 5:
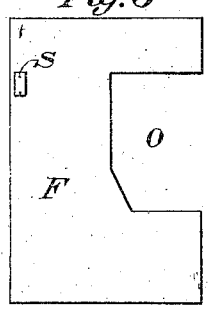

In the drawings, Figure 1 is a front view in perspective of a trap-nest embodying my improvements, with the trap-plate and trigger indicated in dotted lines in the positions which they occupy when the nest is set ready for the entrance of the hen. Fig. 2 is a similar view of the rear of the said casing, showing the application of a door. Figs. 3 and 4 are side elevational details, respectively, of the trap-plate and of its trigger. Fig. 5 is a view of the front of the casing, supposed removed. Figs. 6, 7, 8, and 9 are front elevational views of the trap-plate and trigger in successive positions which said devices assume in the operation hereinafter described, the front of the casing and the outline of the hen-opening in it and also the edge line of the right-hand side edge of the casing, which is designated E, being shown in dotted lines. Fig. 10 is a view similar to Fig. 1 with the cover removed and with the trap-plate and trigger indicated in dotted lines in the positions which they respectively occupy when the hen has entered the casing and is locked within it.

Similar letters of reference indicate corresponding parts in all of the figures.

In the drawings, B is a box or casing for containing the nest within which the hen is to lay. This box may be of any preferred form, dimensions, and material, but is conveniently made of wood and of an approximate height of eighteen (18) inches, breadth twelve (12) inches, and depth ten (10) inches, which dimensions may of course be varied. Within this casing or box, which has a top, but, preferably, no bottom, the nest material is so placed as to occupy its lower portion and to rest either upon the casing's bottom when used or upon the shelf, platform, floor, or other base upon which the device is deposited. I prefer to provide the casing either at the top or back with a lid or cover C or a door D, as respectively shown in Figs. 1, 2, and 10.

F is the front of the box or casing, provided conveniently about midway of the height and preferably at one side with a hen-opening O, Fig. 5, through which the hen may enter the box. It being a desideratum in devices of this character that while it should be easy for a hen to enter them it should be impossible for her to escape after once being within them or for another hen to follow her into them, so the two hens should occupy the same nest at the same time, I have provided in connection with the hen-opening O an attachment which I term the "trap-plate" A. This trap-plate, a preferred form of which is represented in the drawings and shown detached in Fig. 3, is in the nature of a depending pivoted laterally oscillatory or swinging gravitative device which operates in the plane of the hen-opening O and serves to almost but not completely occlude said opening in the front of the casing and which embodies a preferably-curved lateral recess $a$ in one of its sides, a trigger-lifting arm or extension $a'$, and a trigger-notch $a^2$ for engagement with the trigger hereinafter referred to. The trap-plate is suspended within the casing against the inner face of that front which embodies the hen-opening O by a pivot-pin $c$, which projects from said inner face of said front and passes through an aperture $a^x$ in the upper portion of the plate. The plate depending from the pivot-pin normally occupies by virtue of the form of its lower or occluding portion proper (designated $a^3$) a position indicated in Figs. 1 and 6, in which, as will be apparent, the curved recess $a$ in its side forms relatively to the side of the casing and in registry with the hen-opening O a vertical opening of substantially such size as will permit of a hen's introducing her head and neck within the casing. When this has taken place, the plate, as will be easily understood, will afford no real resistance to the further admission of the hen's body, but will swing about its pivot to one side, to the left in the drawings, and into the position represented in Figs. 7 and 8 again, in which the hen-opening in the case which is large enough to admit a hen will be exposed for the entrance of the hen, and will then swing or gravitate back into its first or normal position. (Indicated in Figs. 9 and 10.)

Figure 6:
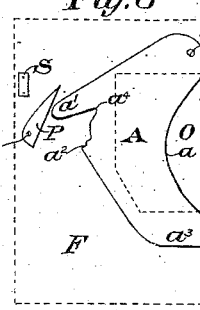
Figure 7:
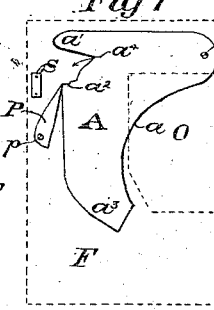
Figure 8:
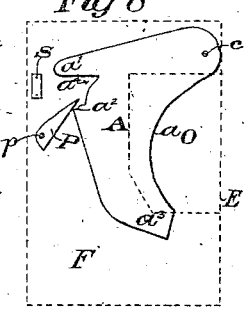
Figure 9:
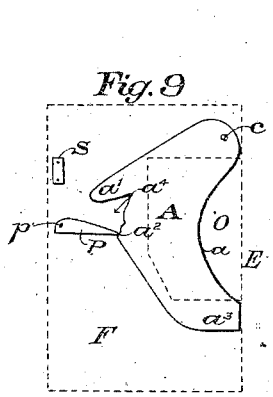
Figure 10:
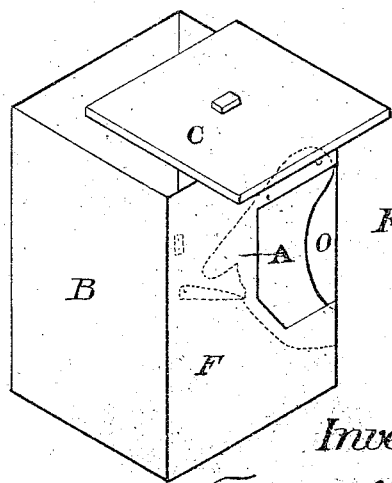

To coöperate with the trap-plate and in order after the entrance of the hen to automatically lock the plate in its normal position, as in Figs. 9 and 10, and occlude the hen-opening O, I provide a pawl or trigger P, Fig. 4, which is pivoted by a trigger-pin $p$, projecting from the inside face of the front of the casing and passing through an aperture $p^\times$ in the head of the trigger and which is adapted to normally occupy the position represented in Figs. 1 and 6 and rest idly against the trigger-arm or extension $a'$ of the trap-plate, but which in the lifting of the plate and after its escape from contact with said arm will gravitate to the right against that edge of the plate which faces it, as shown in Fig. 7, and which in the return or descent of the plate after its lifting by the entrance of the hen will drop from the position represented in Figs. 7 and 8 into the horizontal position represented in Figs. 9 and 10, and in said position will engage with the trigger-notch $a^2$ of the plate, and thereby lock the plate in the position shown in said figures and prevent the escape of the hen, which after laying is to be removed, preferably through the cover-provided top or door-provided back of the case.

$a^4$ is a cut-away portion of the edge of the trap-plate between its trigger-arm $a'$ and its notch $a^2$, which permits of the dropping action of the trigger into the notch, and S is a stop to insure the dropping of the trigger.

In the setting of this trap-nest, which is manually performed, the trigger is simply elevated and permitted to rest against the trigger-arm $a'$ of the depending trap-plate, as indicated in Figs. 1 and 6. Its further movement in the operation of the trap-plate and until its drop to effect its action of locking the plate is automatic; but its releasing and resetting must be done by hand and after the removal of the hen.

The precise form of the trap-plate is not of the essence of the invention, nor yet, indeed, the precise form of the trigger. I prefer, however, to form the plate of substantially the outline indicated in the drawings, with the pivot-pin aperture $a^\times$ in the upper portion, the arm-provided portion extending laterally away from said aperture, the notch in close relation to the arm, and the depending or occluding recess-embodying portion extending approximately at right angles downward and away from the upper portion.

The form of plate represented bears a predetermined dimensional relation to the casing-front to which it is applied and to the hen-opening therein, and the curved recess of the plate, which constitutes the opening for the entrance of the hen's head and neck, occupies a position on the opposite edge from that occupied by the trigger and notch adapted to register with the hen-opening and preferably about midway between the lower or bottom portion and the upper or aperture-provided portion of said plate. The curved form of this hen-head recess $a$ I regard as preferable. The trap-plate is also preferably made of wood of suitable thickness to unfailingly operate with the trigger, which may be made of a breadth in excess of that of the plate; but other materials than wood may of course be employed for both the trap-plate and the trigger and, if desired, for the casing itself.

Having now described my invention, I claim and desire to secure by Letters Patent—

1. In combination with the casing of a trap-nest which embodies a hen-opening, a swinging trap-plate having a lateral recess and adapted to expose or close said hen-opening, and a trigger adapted to automatically lock said plate in its "closed" position, substantially as and for the purpose specified.

2. In a trap-nest, in combination with a casing having a hen-opening in one of its sides, a depending trap-plate formed with a lateral recess adapted to register with the hen-opening and embodying a trigger-arm and notch, and a trigger to lock said plate in its position of aforesaid registry with the hen-opening, substantially as set forth.

In testimony whereof I have hereunto signed my name in the presence of two subscribing witnesses.

FRANK ORVILLE WELLCOME.

Witnesses:
FRANK W. BUCKMAN.
EDGAR F. CASSWELL.